T. A. PARKER.
SELF ALINING BEARING BOX AND AXLE FOR MINE CARS AND THE LIKE.
APPLICATION FILED APR. 29, 1919.
1,329,847.
Patented Feb. 3, 1920.
3 SHEETS—SHEET 1.
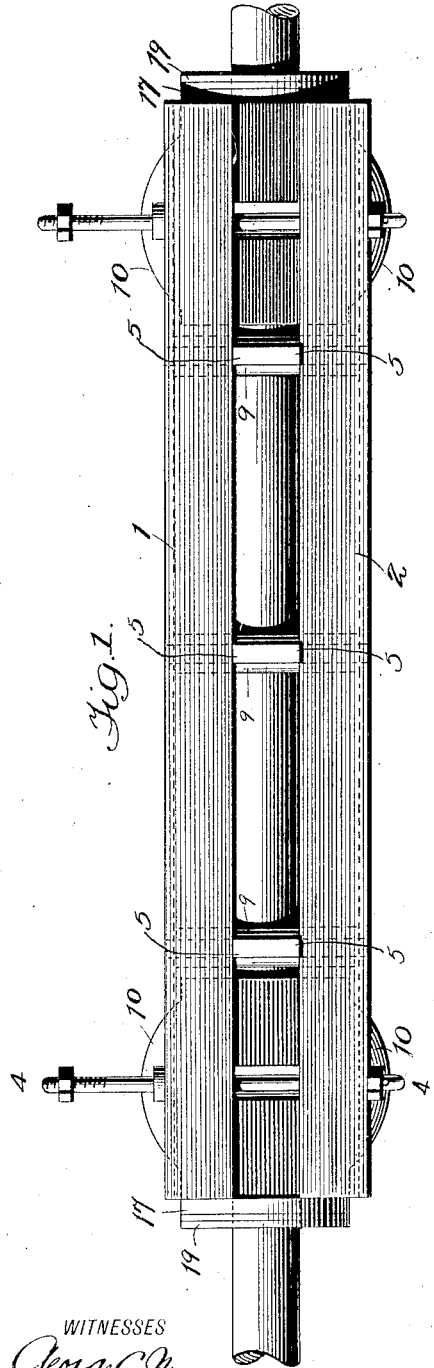
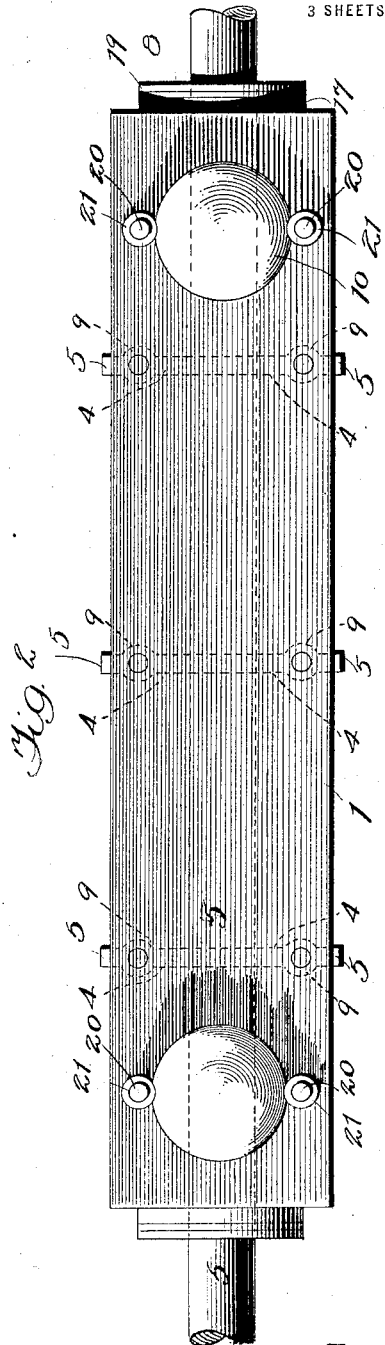
INVENTOR
T. A. PARKER, T. A. PARKER.
SELF ALINING BEARING BOX AND AXLE FOR MINE CARS AND THE LIKE.
APPLICATION FILED APR. 29, 1919.
1,329,847.
Patented Feb. 3, 1920.
3 SHEETS—SHEET 2.
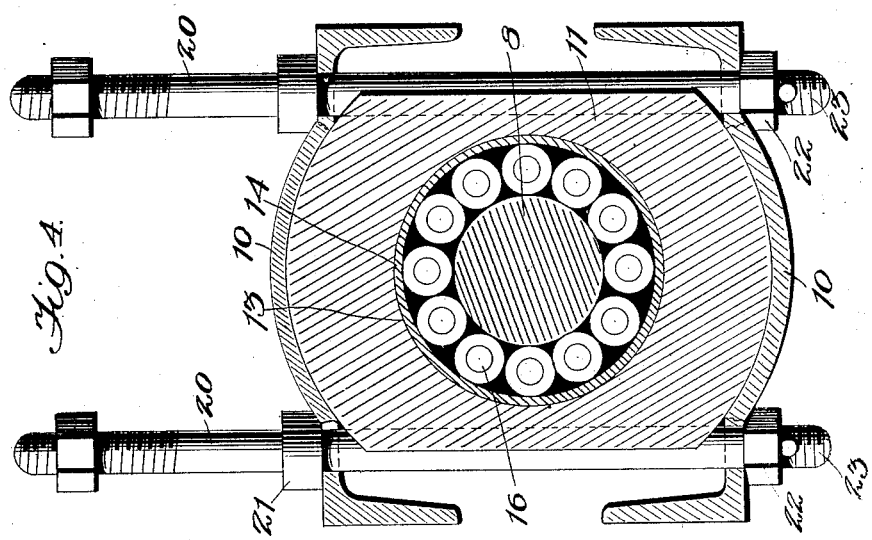
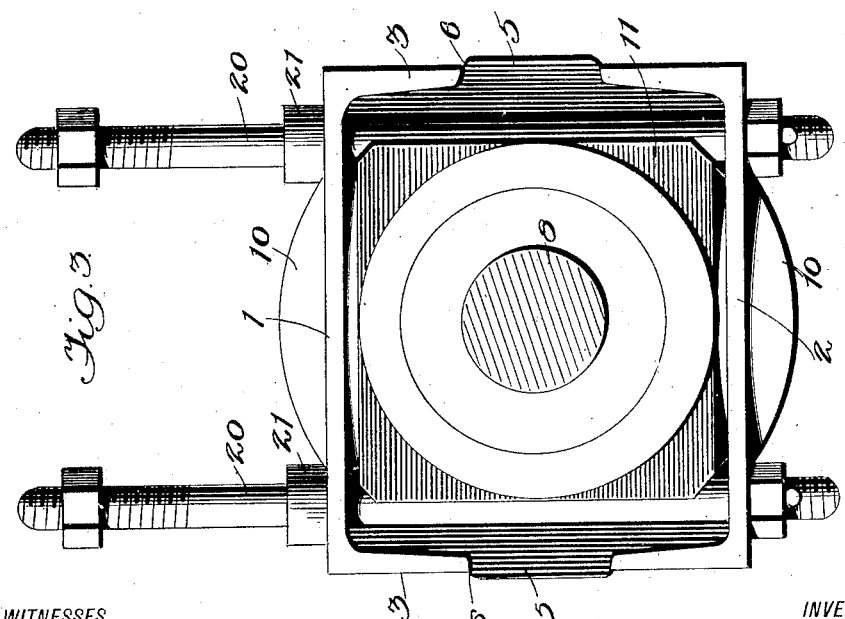
WITNESSES
George A. Myers.
INVENTOR
T. A. PARKER,
BY
ATTORNEYS

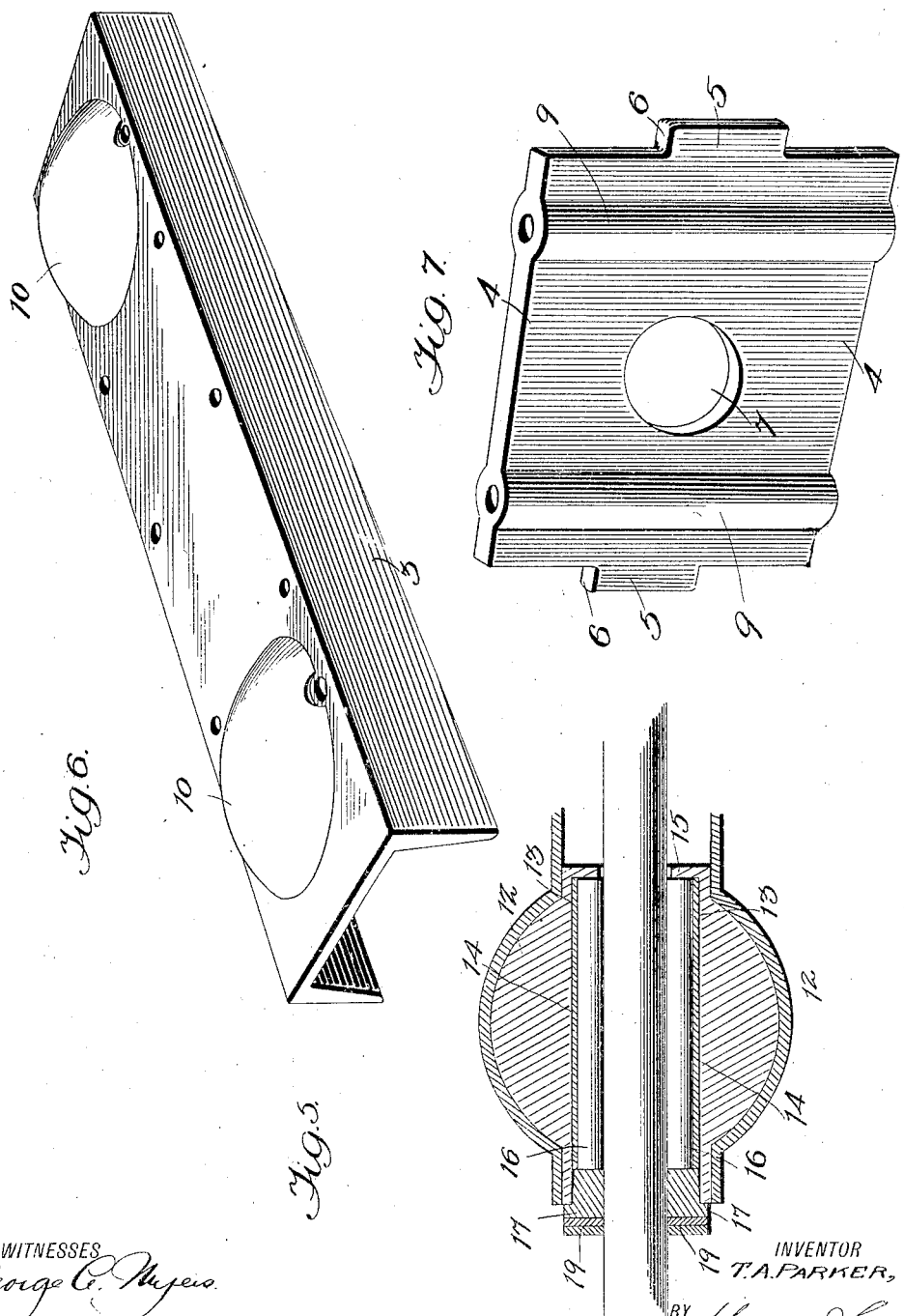

UNITED STATES PATENT OFFICE.

THATCHER ANSLEM PARKER, OF BRAZIL, INDIANA.

SELF-ALINING BEARING-BOX AND AXLE FOR MINE-CARS AND THE LIKE.

1,329,847.  Specification of Letters Patent.  Patented Feb. 3, 1920.

Application filed April 29, 1919. Serial No. 293,505.

*To all whom it may concern:*

Be it known that I, THATCHER A. PARKER, a citizen of the United States, and a resident of Brazil, in the county of Clay and State of Indiana, have invented certain new and useful Improvements in Self-Alining Bearing-Boxes and Axles for Mine-Cars and the like, of which the following is a specification.

This invention relates to an improvement in axles and trucks for mine, railroad and industrial cars.

One of the principal objects of the invention is to provide an improved axle and truck, incorporating in its assembly bearing-boxes of such construction and design that they will be self-adjusting, whereby the axles will be kept in alinement at all times.

A further object is to provide means whereby the bearing-boxes may be permanently attached to the car in a convenient way.

Another object is to provide a construction whereby the distance from center to center of the bearings will remain constant, and whereby equal distribution of the load to the bearings will be attained. Another object is to provide such a construction that the parts may be quickly taken apart and assembled.

With these and other objects in view, which will become apparent as the description proceeds, the invention resides in the constructions, combination and arrangement of parts hereinafter more fully described and claimed, and illustrated in the accompanying drawings in which like characters of reference indicate like parts throughout the several figures of which:

Figure 1 represents a side elevational view of the invention.

Fig. 2 represents a top plan view thereof.

Fig. 3 represents an end elevational view.

Fig. 4 represents a view in section taken transversely on the plane indicated by the line 4—4 of Fig. 1.

Fig. 5 represents a longitudinal section taken on the plane indicated by line 5—5 of Fig. 2.

Fig. 6 represents a view in perspective of one of the channel members.

Fig. 7 represents a view in perspective of one of the separators.

Referring more particularly to the drawings, the truck assembly includes an upper channel member 1, and a lower channel member 2, identical in shape, and of a cross sectional configuration approximating the shape of the letter U, each of the channel members being provided with lateral flanges 3. The channel members are spaced apart at intervals by means of the separators 4. These separators extend transversely of the assembly, and are provided with lateral ears 5, forming shoulders 6, against which the edges of the flanges 3 of the channel members bear. Openings 7 provided in the separators receive the axle 8. These separators are provided with drilled sleeve portions 9 for receiving bolts (not shown), for detachably securing the channel members and separators together.

Each of the channel members, adjacent its ends, is provided with a socket 10 of a concavo convex formation, such socket forming a segment of a hollow sphere.

Positioned between the channel members, one at each end of the assembly, is a pair of bearing-boxes indicated generally at 11. These bearing-boxes are of general cubical formation, and are provided on their upper and lower surfaces with enlargements or ball portions 12, which fit into the socket 10 of the channel members.

The boxes are each bored centrally, from one end, which is the outer end, to a point adjacent the opposed end, as at 13, and in this bore is placed a lining or bushing 14. The axle projects through the bearing box, an opening 15 in the closed end of the box being provided for receiving the axle, it being noted that the bore of the box is of a greater diameter than the diameter of the axle, whereby to provide an annular space between the axle and the bushing for receiving roller bearings 16. Plain bearings may if desired be used in lieu of the roller bearings.

The outer end of the bearing-box is closed by means of a collar 17 provided with a reduced portion which may be pressed into the open end of the box. Beyond the collar a pair of friction washers 19 are disposed.

The axle is preferably a plain straight axle, and in this connection I might state that I may use an axle such as disclosed in my Patent No. 1289249, as such axle provides an excellent method of oiling the bearing-boxes.

The boxes, on the opposed sides, are vertically grooved or channeled, and into these channels or grooves fit bolts 20. These bolts are provided with collars 21 which bear against the top surface of the upper channel, and are threaded at their lower ends for receiving nuts 22, which may be turned up against the under surface of the lower channel member, such nuts being retained in place by means of cotter pins 23 or the like. The channels or grooves cut in the faces of the bearing-boxes are preferably wider than the diameter of the bolts 20, so that movement of the bearing-boxes in alining the axles may be allowed, and at the same time excessive play or movement of the boxes will be prevented, the edges of the grooves or channels by abutting against the bolts, limiting the movement of the bearing-boxes.

These bolts, together with the bolts which connect the separators and the channel members, serve as means for securing the axle assembly to the bottom or sill of the car.

By the construction I have provided, it will be readily understood that the bearing-boxes by reason of their ball and socket method of support will readily adjust themselves in keeping the axles properly alined. It will further appear that the assembly is exceedingly simple, and can be easily and expeditiously taken down and reassembled.

I may utilize any suitable material in the construction of the assembly, and for reasons of convenience I have illustrated the use of standard rolled steel sections in making the channel members.

The separators may be made of cast iron if desired, while the bearing-boxes, bushings and other parts are preferably made of steel.

The invention may be used to good advantage in connection with axles of any mine, railroad or industrial cars and the like.

Although I have described the preferred embodiment of my invention, I may desire to make such changes in the construction, combination and arrangement of parts thereof, as do not depart from the spirit of the invention and the scope of the appended claims.

I claim:—

1. In a truck and axle assembly for mine cars and the like, the combination of a pair of spaced channel members having sockets formed adjacent their ends, bearing-boxes disposed between the channel members and having ball portions fitting into the sockets in the channel members, fastening means connecting the channel members and extending through slots in the bearing-boxes, an axle projecting through bores provided in the bearing-boxes, and bearings surrounding the axle within the bearing-boxes.

2. A truck and axle assembly comprising a pair of spaced channel members, said channel members, being provided with opposed sockets, bearing-boxes positioned between the channel members and provided with ball portions fitting into the sockets, means connecting the channel members, and extending through grooves cut in the bearing-boxes for limiting the movement of the latter, an axle projecting through the bearing-boxes, and bearings surrounding the axle within the bearing-box, substantially as described.

3. A truck and axle assembly including spaced members provided with opposed sockets, bearing-boxes positioned between the members and having ball portions fitting in the sockets, members passing through the spaced members and engaging said boxes for limiting the movements of the bearing-boxes relatively to the spaced members, an axle projecting through the bearing-boxes, and an antifriction means surrounding the axle within the bearing-boxes.

4. A truck and axle assembly including a pair of spaced channels members, bearing-boxes disposed between the channel members, separators disposed between the channel members, fastening means connecting the channel members and separators together, said fastening means being adapted to secure the assembly to the body of a car.

5. A truck and axle assembly including a pair of spaced members, a bearing box movably mounted between the spaced members and provided in its opposite sides with grooves, and members extending between said spaced members and engaging within said grooves whereby to limit the movement of said boxes.

THATCHER ANSLEM PARKER.